United States Patent [19]

Swertz

[11] Patent Number: 4,781,082
[45] Date of Patent: Nov. 1, 1988

[54] KIT FACILITATING REMOVAL OF WHEEL LUG STUD AND ASSOCIATED METHOD

[76] Inventor: Edward P. Swertz, 28 Williamstown Ct., Apt. 8, Cheektowaga, N.Y. 14227

[21] Appl. No.: 26,032

[22] Filed: Mar. 16, 1987

[51] Int. Cl.[4] ............................................. B25B 13/00
[52] U.S. Cl. ....................................... 81/53.2; 81/120
[58] Field of Search ............. 81/53.2, 441, 120, 124.1, 81/181, 121.1, 177.85, 186; 29/275, 251

[56] References Cited

U.S. PATENT DOCUMENTS

| | | | |
|---|---|---|---|
| 1,093,252 | 4/1914 | Carnes | 81/181 |
| 4,607,547 | 8/1986 | Martus | 81/53.2 |
| 4,631,989 | 12/1986 | Trowbridge | 81/177.85 |

*Primary Examiner*—Frederick R. Schmidt
*Assistant Examiner*—Lawrence Cruz
*Attorney, Agent, or Firm*—Christel, Bean & Linihan

[57] ABSTRACT

A two-piece kit facilitating the removal of a damaged wheel lug stud from a wheel hub or the like includes a ribbed nut having a splined through-aperture extending between the faces of the nut and drive-on tool defining an axially-extending recess in one of its ends for loosely accepting the nut when the nut is placed endwise within the tool recess. The through-aperture of the nut defines a plurality of radially inwardly-projecting edges extending axially along the nut and is of such size to grip the cylindrical periphery of the lug stud and thereby prevent relative rotation between the stud and the nut body when the nut is operatively driven upon the stud so that the through-aperture encircles the cylindrical periphery of the stud. When the nut body is placed endwise into the tool recess and operatively driven upon the wheel lug stud as aforesaid as the drive-on tool acts as an intermediary member between the nut body and a driving tool, the drive-on tool can be removed from the nut body and the lug stud unscrewed as the nut body is manipulated with a conventional socket wrench. The method of the invention includes the steps involved in using the kit of this invention to remove a damaged lug stud and the drive-on tool to salvage the ribbed nut for reuse.

9 Claims, 2 Drawing Sheets

Fig. 1.
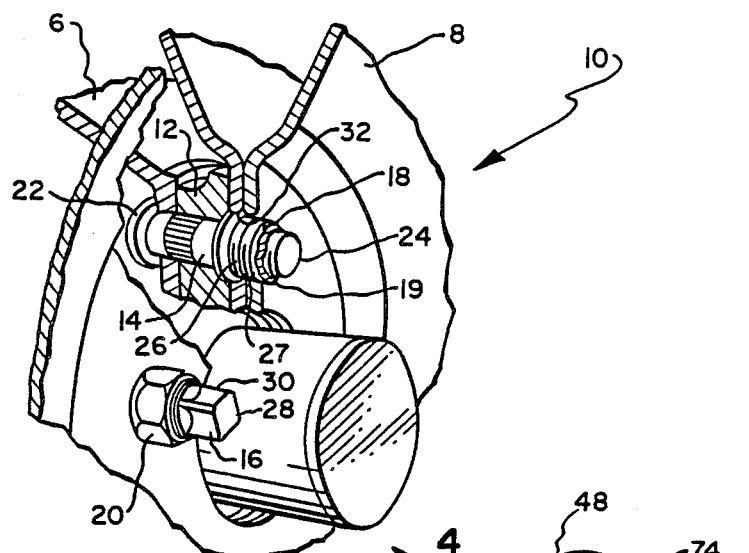
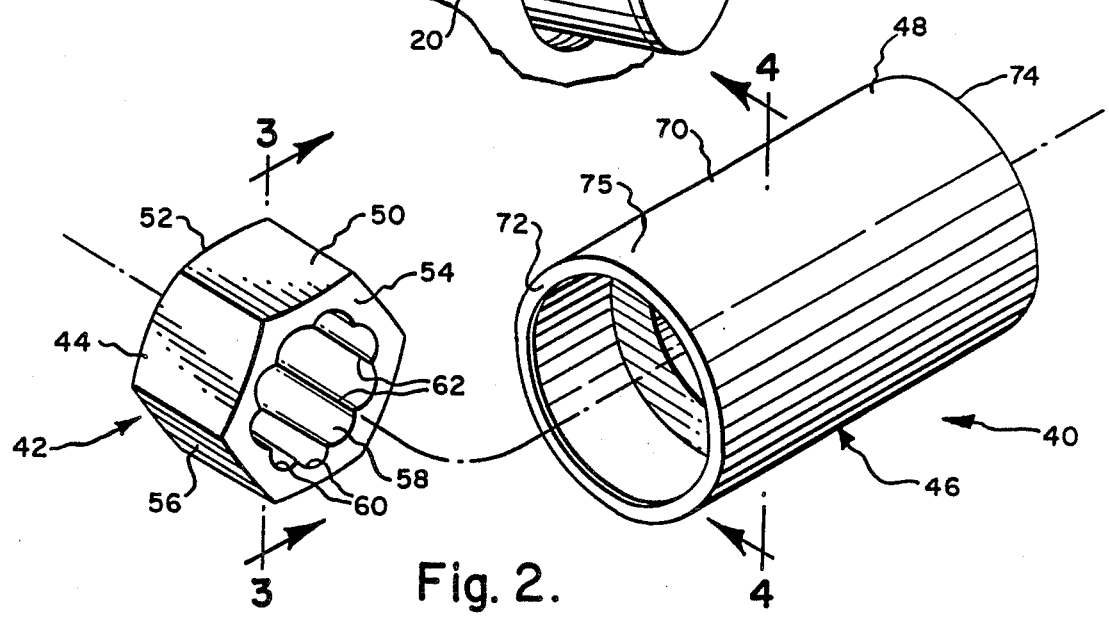
Fig. 2.
Fig. 3.
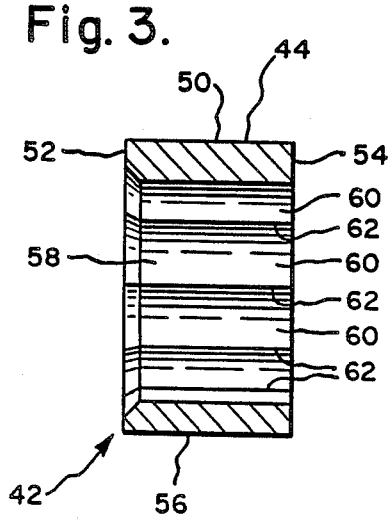
Fig. 4.
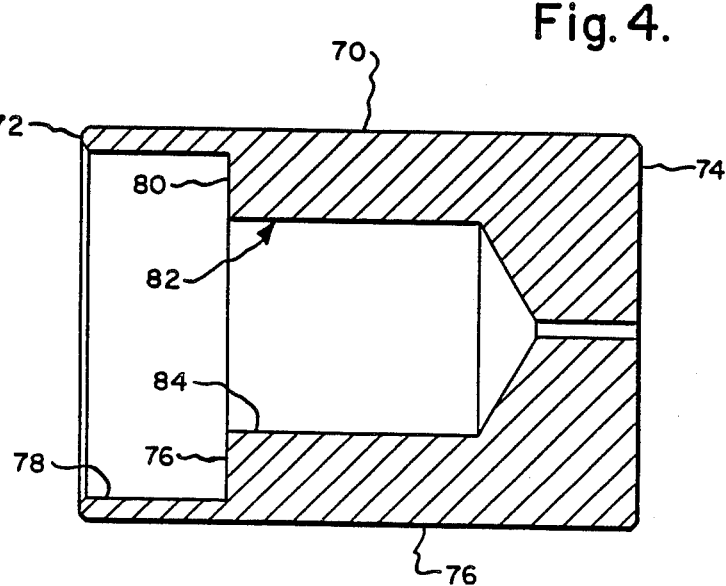

KIT FACILITATING REMOVAL OF WHEEL LUG STUD AND ASSOCIATED METHOD

BACKGROUND OF THE INVENTION

This invention relates generally to wheel lugs and relates more particularly to apparatus for removing damaged lug studs from a vehicle wheel.

The type of lug stud with which this invention is concerned includes an externally-threaded shank having either a solid-core end portion which is retainably threaded within the hub of a wheel or an internally-threaded recess which is retainably threaded upon a pre-mounted lug used in connection with dual wheels, such as are mounted on highway trucks and trailers. For threaded retention within the hub of a wheel, the solid core end portion of the stud shank is threadably accepted by an internally-threaded aperture in the wheel hub. For threaded retention upon a pre-mounted lug used in connection with dual wheels, the internally-threaded recess opens from one end of the stud shank for threadably accepting the threads of the pre-mounted lug. The externally-threaded shanks of the aforedescribed studs, in turn, threadably accept the threads of a conventional lug nut for securing a wheel rim upon the stud.

It is known that such a wheel lug stud can be damaged to a degree requiring that the lug stud be replaced. Such damage may be characterized by stripped threads or a shearing or breaking off a portion of the lug stud. It is believed that such damage is sometimes promoted by high amounts of torque commonly applied to a lug nut while tightening the lug nut upon the lug stud with an impact wrench or a similar torquing tool.

Conventional methods of removing a damaged lug stud have hereto for been either time-consuming or relatively costly. For example, one conventional and time-consuming method includes the steps of threading a conventional lug or "hex" nut upon the threads of a damaged stud until the threads of the lug nut bite into or grip the threads of the damaged stud, welding the nut to the stud to fixedly attach the nut and stud together and unscrewing the damaged stud from the wheel by appropriately rotating the nut with a standard socket or wrench. In addition to the relatively great deal of time and effort required to remove the stud by the aforedescribed conventional method, the method is further limited in that wheel components located in the vicinity of the stud could be damaged from the concentrated heat source supplied from the welding torch.

Another conventional method involves the use of a stud removing tool in the form of an elongated body having a splined recess extending axially into the tool body from one end thereof and defining a nut-like portion at its other end. The splined recess has an interior wall defining a plurality of radially inwardly-directed and axially-extending edges adapted to cut or bite into the circumferential surface of the stud when the recess-defining end of the body is hammered over the lug stud so as to prevent relative rotation between the lug stud and tool body. Once the tool body is hammered upon the stud as aforesaid, the lug stud can then be unscrewed by rotating the nut-like end portion of the tool body with a conventional socket or wrench.

A limitation associated with the use of the aforedescribed stud removing tool relates to the fact that the tool can only be used a relatively limited number of times, such as, for example, eight to ten times, before the edges defined along the wall of the splined recess are dulled to an extent that the stud removing tool can be no longer operatively driven upon a stud. Inasmuch as the stud removing tool is relatively expensive to replace, frequent removal of damaged studs can be relatively costly.

Accordingly, an object of the present invention is to provide a kit facilitating removal of damaged lug studs and which circumvents limitations associated with the aforedescribed conventional means and methods of using the kit.

Another object of the present invention is to provide such a kit having a wear member which can be replaced inexpensively so that frequent removal of damaged studs does not involve incipient costs.

Still another object of the present invention is to provide a method of salvaging the wear member of such a kit for reuse.

Yet still another object of the present invention is to provide such a kit which is economical to manufacture and effective in operation.

SUMMARY OF THE INVENTION

This invention resides in a kit facilitating removal of a damaged wheel lug stud from a wheel and a method of using the kit. The wheel lug stud of the type with which this invention is concerned includes a shank-like portion defining a cylindrical periphery therearound.

The kit of this invention includes a drive-on tool and means defining a ribbed nut including an elongated body having two opposite and parallel end faces, an exterior surface adapted to be operatively clasped by a conventional socket wrench, and a central through-aperture extending between the two end faces. The through-aperture provides the nut body with an interior surface adapted to grip the cylindrical periphery of the damaged stud and thereby prevent relative rotation between the stud and the nut body when the nut is operatively driven upon the stud so that the nut body through-aperture encircles the cylindrical periphery thereof. The drive-on tool of the kit defines an elongated rigid body having two opposite ends wherein one of the tool body ends defines a recess adapted to loosely accept the nut body when the nut body is positioned endwise therein and including means for limiting the endwise movement of the nut body into the tool body so that the nut body can be positioned endwise within the recess and operatively driven upon the wheel lug stud as aforesaid as the drive-on tool acts as an intermediary member between the nut body and a driving tool. Once the nut body has been operatively driven upon the lug stud and the drive-on tool has been removed from the nut body, the lug stud can be unscrewed as the nut body is manipulated with a convention socket wrench.

One embodiment of the method of the invention includes the steps involved in utilizing the kit of this invention to remove a damaged wheel lug stud from a wheel. Initially, the kit of this invention is provided and the ribbed nut thereof is operatively placed endwise within the recess of the tool body thereof. The drive-on tool and nut body is then positioned in axial alignment with the lug stud so that the nut body engages the end of the lug stud. With the drive-on tool acting as an intermediary member between the nut body and a hammer or similar driving tool, the nut body is then driven or hammered upon the lug stud so that the nut body aperture encircles and is securely lodged about the cylindrical periphery of the stud. The drive-on tool is then removed from the nut body and the lug stud is unscrewed from the wheel as the nut body is manipulated with a conventional socket wrench.

Inasmuch as the lug stud, once removed with the ribbed nut and conventional wrench, remains securely lodged, or wedged, within the through-aperture of the ribbed nut with the stud protruding from one end face of the nut, the lug stud must be removed from the nut through-aperture before the nut can be reused. Accordingly, an additional embodiment of the method of this invention includes the steps involved in removing the lug stud from, and thus salvaging, the ribbed nut. For purposes of salvaging the nut, the drive-on tool of the kit of the invention includes detent means providing an opening in the bottom of the tool recess for accepting the wheel lug stud when the ribbed nut is positioned one end-face-first within the recess. The steps of this method embodiment thus includes an initial step of providing the drive-on tool of this invention and positioning the ribbed nut one end-face-first within the recess. An elongated punch member is then provided wherein the punch member includes a driven end at one end thereof and an opposite driving end receivable by the through-aperture of the ribbed nut, and the driving end of the punch member is operatively positioned within the through-aperture for forcing the lug stud out of the ribbed nut through the one face of the nut when the driven end of the punch member is struck with a hammering tool. The punch member is subsequently struck with a hammering tool as aforesaid to force the lug stud from the nut.

BRIEF DESCRIPTION OF THE DRAWING FIGURES

FIG. 1 is a fragmentary perspective view, shown partially cutaway, of a wheel having a damaged lug stud of the type whose removal is facilitated with the kit of this invention.

FIG. 2 is a perspective view of a drive-on tool and ribbed nut of an embodiment of the kit in accordance with this invention.

FIG. 3 is a cross-sectional view taken about on line 3—3 of FIG. 2.

FIG. 4 is a cross-sectional view taken about on line 4—4 of FIG. 2.

DETAILED DESCRIPTION OF THE ILLUSTRATED EMBODIMENTS

Figure 5:
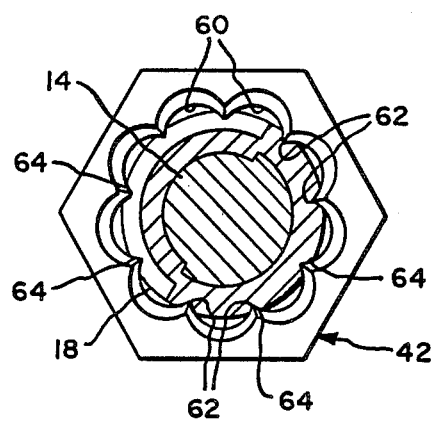
FIG. 5 is a fragmentary plan view illustrating the use of the FIG. 2 kit during securement of the ribbed nut thereof onto the damaged stud of FIG. 1.

Turning now to the drawings in greater detail and considering first FIG. 1, there is shown an exploded fragmentary perspective view of a dual wheel arrangement 10 of the type mounted on a common highway truck or trailer and illustrating an environment in which the kit of this invention can be used. More specifically, the wheel arrangement 10 includes two wheel rims 6, 8, a mounting hub 12, a plurality of lugs 14 (only one shown) extending through the wheel rims 6,8, a plurality of inner dual cap nuts such as are indicated 16,18 operatively mounted upon the lugs 14 and a plurality of outer dual cap or hex nuts 20 (only one shown) operatively mounted upon the inner cap nuts such as the one indicated 16. Each lug 14 has a headed end 22 and an opposite externally-threaded shank-like end portion 24 extending through aligned openings in the rims 6 and 8 of the wheel arrangement 10.

Each inner dual cap nut such as is indicated 16 is in the form of an elongated lug stud 28 having a sleeve-like portion 26, best shown on lug nut 18, at one end thereof and a nut-like portion 30 fixedly attached to an end of the sleeve-like portion 26. The sleeve-like portion 26 defines an axially-extending recess 19 opening from the corresponding end of the lug stud 28 which is internally-threaded to be threadably accepted upon the shank-like end portion 24 of a lug 14. Furthermore, the sleeve-like portion 26 defines a cylindrical surface 27 or periphery which is externally-threaded and thus adapted to threadably accept the standard hex lug nut 20. When assembled to secure the wheel rim 8 to the wheel hub 12, the lug stud 28 is threaded upon the shank-like end 24 of the lug 14 and closely received by an opening, indicated 32, in the wheel rim 8 and the hex nut 20 is, in turn, threaded upon the external threads of the sleeve-like portion 26 of the lug stud 28. The lug stud 28 is tightened into place upon the lug 14 by appropriately rotating the nut-like end portion 30 of the nut 16 by means of a conventional socket or wrench, and the nut 20 is tightened upon the lug stud 28 by means of a conventional socket or wrench. The wheel rim 8 is thereby secured to the wheel hub 12 as the wheel rims 6,8 are tightly held between the headed end 22 of the lug 14 and the hex nut 20.

The inner dual cap nut 18 is shown in FIG. 1 in a broken condition with the nut-like end portion thereof (not shown) completely separated from the sleeve-like portion 26 so that the sleeve-like portion 26 remains on the lug 14. It will be understood that with the nut-like end portion of the lug stud 18 being separated from the sleeve-like portion 26, the sleeve-portion 26 cannnot be removed from the inner lug 14 by means of a conventional socket or wrench. However, and as will be explained in greater detail hereinafter, the apparatus or kit of this invention facilitates the removal of the broken lug stud 18 including a member, hereinafter described, for securement to the broken stud 18 and which permits a conventional socket or wrench to be used to remove the broken stud 18 from the lug 14.

In accordance with the present invention and with reference to FIGS. 2-4, there is shown an embodiment of a kit, generally indicated 40, in accordance with the kit of the present invention. The kit 40 includes means, generally indicated 42, defining a ribbed nut 44 and means, generally indicated 46 defining a drive-on tool 48. As best shown in FIGS. 2 and 3, the ribbed nut 44 includes an elongated steel body 50 having two opposite and parallel end faces 52,54 and an exterior surface 56 extending between the end faces 52 and 54 The exterior surface 56 is hexogonal with six planar surfaces and is of such configuration to be operatively clasped by a conventional socket wrench.

In accordance with the kit 40 of this invention, the body 50 of the ribbed nut 44 defines a central through-aperture 58 extending between the two end faces 52 and 54 adapted to grip the cylindrical periphery of the sleeve-like portion 26 of the broken nut 18 when the ribbed nut 44 is driven upon the broken nut 18. To this end, the central-through aperture 58 defines a series of axially-extending grooves 60,60 spaced circumferentially thereabout so as to form a series of radially inwardly-projecting edges or ribs 62,62. As best shown in FIG. 2, each groove 60 is generally arcuate in cross-sectional shape and each rib 62 or 62 is generally V-shaped in cross-section. The diameter of the aperture opening generally and collectively bounded by the ribs 62,62 is slightly smaller than the diameter of the sleeve-like portion 26 of the broken stud 18 for a reason which will be hereinafter apparent. In further accordance with the present invention, each groove 60 is beveled adjacent the nut end face 52 to provide a beveled opening for the through-aperture 58 for a reason which will be apparent hereinafter.

With reference to FIGS. 2 and 4, the drive-on tool 48 is in the form of an elongated body 70 of rigid material, such as steel, having two opposite ends 72, 74 and a cylindrical exterior surface 75 extending between the two ends 72 and 74. As best shown in FIG. 4, the body ends 72 and 74 are each generally contained in planes which are generally parallel to one another and perpendicular to the longitudinal axis of the tool body 70.

In accordance with the kit of the present invention, the end 72 of the tool body 70 defines an axially-extending circular recess 78 adapted to loosely accept the nut body 50 when the nut body 50 is inserted endwise therein and defines a bottom surface or ledge 76 against which an end face of the ribbed nut 44 is adapted to abut. As best shown in FIG. 4, the recess bottom 76 is contained generally within a plane oriented parallel to that of the tool body ends 72 and 74. The depth of the recess 78 as measured between the plane of the tool body end 72 and the recess bottom 76 is no greater than the thickness of the ribbed nut 44 as measured between the nut end faces 52 and 54. As will be hereinafter apparent, the tool body 70 is intended to be used as an intermediary member between the ribbed nut 44 and a hammer 80 (FIG. 5) or similar driving tool as the nut 44 is driven or hammered upon the broken lug stud 18. Accordingly, the tool body 48 is of such strength that repeated blows of a hammer upon the tool body end 74 will not appreciably damage the tool body 70. In accordance with the kit of this invention, the tool body 70 further includes detent means 82 providing an opening 84 in the bottom 76 of the recess 78 for purposes of salvaging, in a manner hereinafter set forth, the ribbed nut 44 for reuse.

With reference to FIG. 5, there is shown the kit 40 being used to secure the ribbed nut 44 of the kit 40 to the broken lug 18. The ribbed nut 44 has initially been positioned endwise within the circular recess 78 of the tool body 70 so that the end face 54 abuts the recess bottom 76, and the tool body 70 and nut 44 arranged in axial alignment with the damaged stud 18 so that the beveled opening of the nut body through-aperture 58 is aligned with and engages the protruding end of the stud 18. With the nut 44 held in alignment with the damaged stud 18 as aforedescribed, the hammer 80 is used to strike the end 74 of the tool body 70 to thereby drive the nut 44 upon the broken stud 18.

Figure 6:
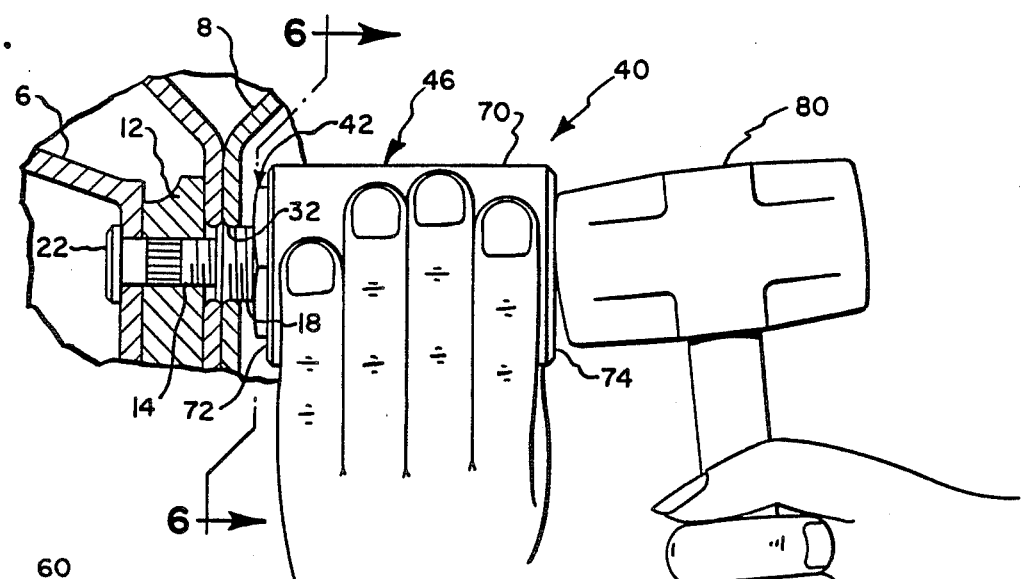
FIG. 6 is an end view of the ribbed nut of FIG. 5 as seen generally from the right in FIG. 5 after being securely driven upon the damaged stud of FIG. 1.
Figure 6:
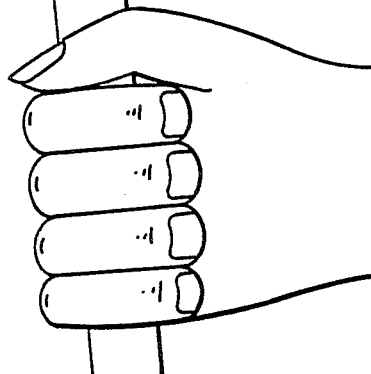

As the nut 44 is driven upon the stud 18 and with reference to FIG. 6, the ribs 62,62 act as cutting edges to cut channels 64,64 or grooves axially along the circumferential periphery of the stud 18. The ribs 62,62 collectively grip the stud 18 as the ribs 62,62 cooperate with the channels formed along the circumferential periphery of the nut 44 to prevent relative rotation between the nut 44 and stud 18. The nut 44 is driven upon the lug stud 18 until the nut body end face 52 engages the wheel rim 8 to ensure that the nut 44 is securely lodged upon the stud 18, and the tool body 70 is removed from the nut 44 to expose the exterior surface 56 of the nut 44. The exposed nut 44 is then appropriately manipulated or rotated with a conventional socket or wrench to unscrew the lug stud 18 from the lug 14.

One advantage provided by the kit 40 of this invention relates to the aforedescribed operation of the kit. By simply hammering the nut 44 upon the stud 18 as aforedescribed, the nut 44 is secured to the damaged stud 18 for removal with a conventional socket wrench. There is no welding step required to tack or otherwise fix the nut 44 to the stud 18 and there is no concentrated heat source, such as may be generated by a welding torch, which may damage a component of the wheel arrangement 10 adjacent the lug stud 18.

Another advantage of the kit of the invention relates to the relatively low cost of utilizing the kit 40 for frequent removal operations of damaged lug studs. It is known that the ribs 62,62 of the nut 44 can become relatively dull after being repeatedly driven upon damaged studs. When the ribs 62,62 becomes dull, the nut 44 cannot be driven upon a lug stud without difficulty so the nut 44 must be replaced in the kit 40 with a ribbed nut of like construction. The cost of replacing the nut 44, however, is relatively low in comparision to the cost of the entire kit 40 so that the kit 40, with its replaceable wear member, or ribbed nut 44, can be used many times with only the occasional cost of replacing the ribbed nut therein.

Although the ribbed nut 44 has been shown and described above as including a through-aperture 58 of a predetermined size or, more specifically, diameter to tightly grip the cylindrical periphery 27 of the lug stud 18 in the manner discussed above wherein the cylindrical periphery 27 has a prescribed diameter, it will be understood that a ribbed nut in accordance with the kit of this invention may include a through-aperture having an diameter of different size than that of the through-aperture 58 to tightly grip a damaged lug stud having a diameter of different size than that of the damaged lug stud 18. Related to the fact that ribbed nuts in accordance with this invention can have through-apertures having diameters within a broad range of sizes, a further advantage of the kit 40 of this invention relates to the adaptability of the drive-on tool 48 to accept, alternatively, two ribbed nuts. If, for example, there are damaged lug studs of two different diameters desired to be removed, the ribbed nut having a through-aperture sized for one of the damaged lug studs can be easily replaced or exchanged with a ribbed nut having a through-aperture sized for the other damaged lug stud. Inasmuch as the cost of a second ribbed nut is generally less than that of a second kit, with drive-on tool and ribbed nut, it is more economical to purchase or make available the second ribbed nut for use with the already-possessed drive-on tool than it is to purchase the second kit.

Figure 7:
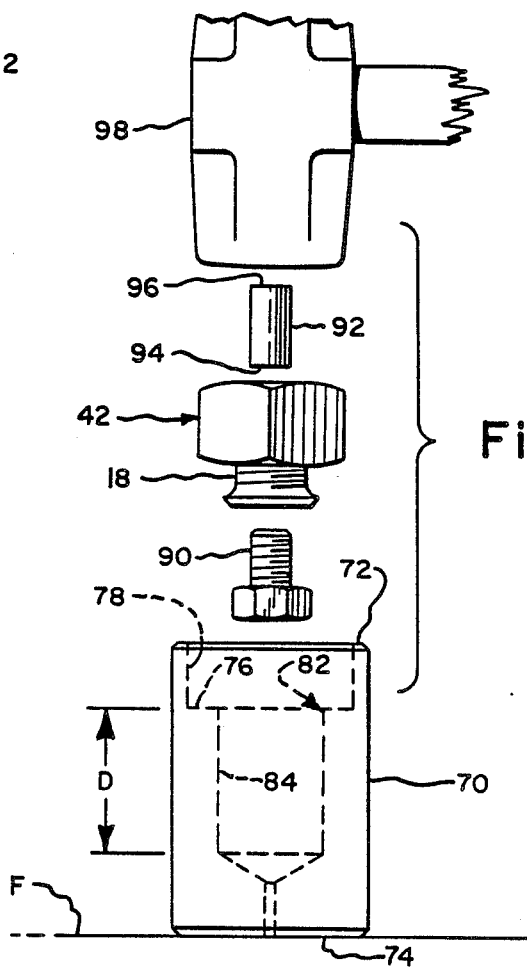
FIG. 7 is a elevation view, shown exploded, of the FIG. 2 kit when salvaging of the ribbed nut of the kit for reuse.

Inasmuch as the damaged lug stud 18, when removed from the remainder of the FIG. 1 wheel arrangement 10, remains lodged or wedged within the through-aperture 58 of the ribbed nut 44, the lug stud 18 must be removed from the nut 44 before the nut 44 can be reused. To this end, the drive-on tool 48 can be used as an anvil member when driving or otherwise forcing the lug stud 18 from the nut 44. With reference to FIG. 7 and in accordance with an embodiment of a method of this invention directed to the salvaging of the nut 44, the drive-on tool 48 is placed upon a solid floor F or similar supporting surface so that the tool body end 72 faces away from the floor F, or upwardly as showing in FIG. 7. A bolt, indicated 90, is then operatively threaded within the internally-threaded recess of the sleeve-like portion 26 of the lug stud 28, and the nut 44 is placed within the tool body recess 78 so that the nut body end face 52 engagedly overlies the recess bottom 76 and the lug stud 18, with bolt 90 secured therein, is loosely accepted by the opening 84 in the recess bottom 76.

With the nut 44 positioned within the tool body recess 78 so that the lug stud 18 is positioned within the opening 84, a punch member, indicated 92, in the form of a drift pin is placed endwise through the nut body through-aperture 58 until one of its ends, or the lower end 94 as shown in FIG. 7, engages the shank end of the bolt 90. While holding the punch member 92 in engagement with the bolt 90 as aforesaid, the other end, or the upper end 96 as shown in FIG. 7, is struck with a hammer 98 to drive or punch the bolt 90 and lug stud 18 from the nut body through-aperture 58. The punch member 92 thereby acts as an intermediary between the lug stud 18 and the hammer 98 to transfer the impact of the hammer 98 to the lug stud 18.

It follows from the above that the opening 84 provided by the detent means 82 is sufficiently large enough to accommodate the positioning of the lug stud 18, while lodged within the ribbed nut 44, within the opening 84 and deep enough to accommodate the lug stud 18 when forced out of the ribbed nut 44 by means of the punch member 92 and hammer 98. Accordingly, the width of the opening 84 is at least as large as the diameter of the lug stud 18 and the depth, indicated D in FIG. 7, of the opening 84, which could extend completely through the tool 48, is at least as large as the collective length of the lug stud 18 and head of the bolt 90.

Figure 8:
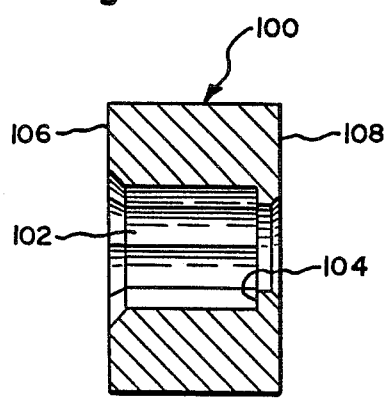
FIG. 8 is a cross-sectional view similar to FIG. 3 illustrating an alternative embodiment of a ribbed nut of the kit of this invention.

It will be understood that numerous modifications and substitutions can be had to the aforedescribed embodiments without departing from the spirit of the invention. For example, although the ribbed nut 44 of FIGS. 2-7 has been shown and described as including a through-aperture 58 having grooves 60 which extend from one nut body face 52 to the other face 54, there is shown in FIG. 8 a ribbed nut 100 in accordance with the kit of this invention having two opposite end faces 106,108 and a through-aperture 102 in which is defined a planar shoulder 104 adjacent the end face 108. Accordingly, the grooves defined in the through-aperture 102 extend from the end face 106 and terminate in the plane of the shoulder 104. Furthermore, although the aforedescribed method embodiment directed to the salvaging of the ribbed nut 44 and illustrated in FIG. 7 includes a step of threading the shank of a bolt 90 within the threaded recess of the lug stud 18, such a step provides a larger and perhaps smoother surface for striking with the punch member 92 then would be provided by the damaged end of the stud 18, and is a step which will not be utilized in a salvaging process in accordance with the method of this invention requiring the removal from a ribbed nut of a lug stud having a solid core and thus not having an internally-threaded recess. Accordingly, the aforedescribed embodiments are intended for the purpose of illustration and not limitation.

I claim:

1. A kit facilitating the removal from a wheel of a damaged wheel lug stud having a shank-like portion defining a cylindrical periphery therearound, said kit comprising:

means defining a ribbed nut including an elongated body having a longitudinal axis and defining two opposite and parallel end faces, an exterior surface extending between said end faces and of such configuration to be operatively clasped by a conventional socket wrench, and a central through-aperture extending between said two end faces, said through-aperture providing said nut body with an interior surface adapted to grip the cylindrical periphery of the damaged stud so that the stud-gripping interior surface is defined by the nut body and thereby prevent relative rotation between the stud and said nut body when said nut is operatively driven upon the stud so that said through-aperture encircles the cylindrical periphery thereof; and a drive-on tool defining an elongated rigid body having two opposite ends, one of said ends definng a recess adapted to loosely accept said nut body when said nut body is positioned endwise therein and including means for limiting the endwise movement of said nut body into said tool body so that said nut body can be positioned endwise within said recess and operatively driven upon the wheel lug stud as aforesaid as said drive-on tool acts as an intermediary member between said nut body and a driving tool so that once said nut body has been operatively driven upon the lug stud and said drive-on tool has been removed from said nut body, the lug stud can be unscrewed as said nut body is manipulated with a conventional socket wrench, said interior surface of said nut body through-aperture defining a series of axially-extending grooves spaced circumferentially about said through-aperture and extending from one face of said nut body so as to form a series of radially inwardly-projecting edges extending axially along the nut body from said one end face, said inwardly-projecting edges collectively defining an opening extending into said nut body having a diameter which is slightly less than the diameter of the cylindrical periphery of the damaged wheel lug stud so that as said nut body is operatively driven upon said wheel lug stud, said inwardly-projecting edges cut axially-extending channels along the cylindrical periphery of the lug stud and the cooperation between said inwardly-projecting edges and the cut channels prevent relative rotation between the nut body and the lug stud, each groove in said interior surface of said aperture defining a beveled surface at said one end face so that the beveled surfaces of adjacent grooves collectively define a cutting edge which is sloped with respect to the longitudinal axis of said nut body so that when said nut is operatively driven said-one-end face first over the end of the lug stud, the sloped cutting edges of said nut body effectively funnel the lug stud toward said inwardly-projecting edges and thereby facilitate the driving of said through-aperture about the lug stud.

2. A kit as defined in claim 1 wherein said axially-extending grooves extend from said one end face to the other end face.

3. A kit as defined in claim 1 wherein said nut body through-aperture defines an inwardly-directed shoulder positioned adjacent the other end face of said nut body and providing a plane in which each of said axially-extending grooves terminate.

4. A kit as defined in claim 1 wherein said recess of said drive-on tool body includes a bottom and said means in said drive-on tool body for limiting endwise movement of said nut body is provided by said recess bottom.

5. A kit as defined in claim 4 wherein said recess bottom includes detent means providing an opening therein of such size and depth to accept the wheel lug stud after removal from a wheel and lodged within said rib nut when said nut body, with the lug stud lodged therein, is placed one-end-face-first within said opening of said detent means and to accommodate the displacement of the lug stud relative to said nut if driven out of said nut body through-aperture.

6. A kit as defined in claim 1 wherein said end of said drive-on tool body opposite said recess-defining end is contained generally within a plane.

7. A kit as defined in claim 1 wherein the depth of the recess in said body of said drive-on tool is no greater than the distance as measured between said opposite end faces of said nut body.

8. Apparatus facilitating the removal of a damaged wheel lug stud from a wheel hub and the like wherein the lug stud includes a shank-like portion protruding from the hub and said shank-like portion defines a cylindrical periphery therearound, said apparatus comprising:

means defining a nut including an elongated body having a longitudinal axis and defining two opposite end faces, an exterior surface adapted to be operatively received by a conventional socket wrench, and a splined through-aperture extending between said two end faces so that the splines of the through-aperture are defined by the nut body and provided with an interior surface adapted to form channels extending axially along the cylindrical periphery when said nut body is hammered upon the lug stud so that said through-aperture encircles the cylindrical periphery of the lug stud and so that the cooperation between said through-aperture and the formed channels prevents relative rotation between the stud and said nut body; and a drive-on tool defining an elongated rigid body having two opposite ends, one of said ends defining a recess adapted to loosely accept said nut body when said nut body is positioned endwise therein and said recess defining a recess bottom for limiting the endwise movement of said nut body into said tool body so that said nut body can be operatively positioned within said recess and driven upon the lug stud as aforesaid as said drive-on tool is struck with the hammering tool so that once the nut body has been operatively driven upon the lug stud and the drive-on tool has been removed from said nut body, the lug stud can be unscrewed from the wheel hub as said nut body is manipulated with a conventional socket wrench, the splined interior surface of said nut body through-aperture defining a series of axially-extending grooves spaced circumferentially about said through-aperture and extending from one end face of said nut body so as to form a series of radially inwardly-projecting edges extending axially along the nut body from said one end face, said inwardly-projecting edges collectively defining an opening extending into said nut body having a diameter which is slightly less than the diameter of the cylindrical periphery of the damaged wheel lug stud so that as said nut body is operatively hammered upon said wheel lug stud, said inwardly-projecting edges cut the axially-extending channels along the cylindrical periphery of the lug stud, each groove in said interior surface defining a beveled surface at said one end face so that the beveled surfaces of adjacent grooves collectively define a cutting edge which is sloped with respect to the longitudinal axis of said nut body so that when said nut is operatively driven said-one-end-face-first over the end of the lug stud, the sloped cutting edges of said nut effectively funnel the lug stud toward the inwardly-projecting edges and thereby facilitate the driving of said through-aperture about the lug stud.

9. A method of removing from a wheel a damaged wheel lug stud having a shank-like portion defining a cylindrical periphery therearound, said method comprising the steps of:

providing means defining a ribbed nut including an elongated body having a longitudinal axis and defining two opposite and parallel end faces, an exterior surface extending between said end faces and of such configuration to be operatively clasped by a conventional socket wrench, and a central through-aperture extending between two said end faces, said through-aperture provided with an interior surface adapted to grip the cylindrical periphery of the damaged stud so that the periphery-gripping interior surface is defined by said nut body and thereby prevent relative rotation between the stud and said nut body when said nut body is operatively driven upon the stud so that when said through-aperture encircles the cylindrical periphery thereof, said interior surface of said nut body through-aperture defining a series of axially-extending grooves spaced circumferentially about said through-aperture and extending from one end face of said nut body so as to form a series of radially inwardly-projecting edges extending axially along the nut body from said one end face, said inwardly-projecting edges collectively defining an opening extending into said nut body having a diameter which is slightly less than the diameter of the cylindrical periphery of the damaged wheel lug stud so that as said nut body is operatively hammered upon said wheel lug stud, said inwardly-projecting edges cut axially-extending channels along the cylindrical periphery of the lug stud, each groove in said interior surface defining a beveled surface at said one end face so that the beveled surfaces of adjacent grooves collectively define an edge which is sloped with respect to the longitudinal axis of said nut so that when said nut is operatively driven said-one-end-face-first over the edge of the lug stud, the sloped edges of said nut effectively funnel the lug stud toward the inwardly-projecting edges and thereby facilitate the driving of said through-aperture about the lug stud;

providing a drive-on tool defining an elongated rigid body having two opposite ends, one of said ends defining a recess adapted to loosely accept said nut body when said nut body is positioned endwise therein and including means for limiting the endwise movement of said nut body into said tool body;

positioning said nut body other-end-face-first and endwise within said recess;

positioning said drive-on tool and said nut body in axial alignment with the lug stud and so that said sloped edges of said nut body engages an end of the shank-like portion of the lug stud;

driving said nut body upon said lug stud so that said nut body through-aperture encircles the cylindrical periphery of the stud as said drive-on tool acts as an intermediary member between said nut body and a driving tool and until said nut body is securely lodged about the stud;

removing said drive-on tool from said nut body; and unscrewing the lug stud from the wheel as said nut body is manipulated with a conventional socket wrench.

* * * * *